(12) United States Patent
Vampola et al.

(10) Patent No.: US 9,100,545 B2
(45) Date of Patent: Aug. 4, 2015

(54) IMAGE DEVICE HAVING A PLURALITY OF DETECTORS IN A TIME DELAY AND INTEGRATION (TDI) CONFIGURATION AND ASSOCIATED METHOD

(75) Inventors: John L. Vampola, Santa Barbara, CA (US); William H. Frye, Goleta, CA (US); Sean P. Kilcoyne, Lompoc, CA (US)

(73) Assignee: RAYTHEON COMPANY, Waltham, MA (US)

( * ) Notice: Subject to any disclaimer, the term of this patent is extended or adjusted under 35 U.S.C. 154(b) by 857 days.

(21) Appl. No.: 12/686,849

(22) Filed: Jan. 13, 2010

(65) Prior Publication Data

US 2010/0177224 A1    Jul. 15, 2010

Related U.S. Application Data

(60) Provisional application No. 61/145,100, filed on Jan. 15, 2009.

(51) Int. Cl.
    *H04N 5/335* (2011.01)
    *H04N 3/14* (2006.01)
    *H04N 5/372* (2011.01)

(52) U.S. Cl.
    CPC ......... *H04N 3/1525* (2013.01); *H04N 5/37206* (2013.01)

(58) Field of Classification Search
    CPC .... B29C 65/00; C12Q 1/6816; H04N 5/3743; H04N 3/1525; H04N 5/37206; G01N 15/147; G01N 21/956
    USPC ................................................. 348/294–295
    See application file for complete search history.

(56) References Cited

U.S. PATENT DOCUMENTS

| 5,652,150 | A  |   | 7/1997  | Wadsworth et al. |
|-----------|----|---|---------|------------------|
| 5,784,101 | A  | * | 7/1998  | Hasegawa ............ 348/282 |
| 5,812,190 | A  | * | 9/1998  | Audier et al. ........ 348/295 |
| 6,303,923 | B1 |   | 10/2001 | Wadsworth et al. |
| 6,392,260 | B1 |   | 5/2002  | Farrier et al. |
| 7,796,174 | B1 | * | 9/2010  | Harwit et al. ........ 348/311 |
| 2002/0020801 | A1 |   | 2/2002 | Wadsworth et al. |
| 2002/0166983 | A1 | * | 11/2002 | Katzir et al. ....... 250/559.45 |
| 2003/0193589 | A1 |   | 10/2003 | Lareau et al. ........ 348/294 |

FOREIGN PATENT DOCUMENTS

EP    0 666 686 A2    8/1995    ............. H04N 3/15

OTHER PUBLICATIONS

PCT Notification of Transmittal of the International Search Report and the Written Opinion of the International Searching Authority, or the Declaration mailed Mar. 3, 2010, with PCT International Search Report, appl. No. PCT/US2010/020978, Ref: 075896.0132, filed Jan. 14, 2010 (12 pgs.).

\* cited by examiner

*Primary Examiner* — Twyler Haskins
*Assistant Examiner* — Carramah J Quiett
(74) *Attorney, Agent, or Firm* — Lando & Anastasi, LLP

(57) ABSTRACT

In certain embodiments, an imaging device includes an image sensor that includes a detector array. The detector array includes a plurality of detectors operable to receive a charge generated by light. The detector array also includes a plurality of detector sub-arrays each including one or more of the plurality of detectors. The one or more detectors of each detector sub-array are in a time delay and integration (TDI) configuration. The image sensor of the imaging device is operable to, for each of the plurality of detector sub-arrays of the detector array, generate an image signal corresponding to a scan of an object.

19 Claims, 9 Drawing Sheets

IMAGE DEVICE HAVING A PLURALITY OF DETECTORS IN A TIME DELAY AND INTEGRATION (TDI) CONFIGURATION AND ASSOCIATED METHOD

RELATED APPLICATIONS

This application claims the benefit under 35 U.S.C. §119(e) of the priority of U.S. Provisional Application No. 61/145,100, filed Jan. 15, 2009, entitled "Charge Transport Silicon PIN Time Delay Integration."

TECHNICAL FIELD

This invention relates generally to imaging devices and more particularly to an imaging device having a plurality of detectors in a TDI configuration and associated method.

BACKGROUND

Conventional techniques for generating an image of an object generally rely solely on mechanical and chemical processes. For example, a conventional camera may include a lens that focuses light generated and/or reflected by an object on film, and the film, through a chemical reaction on the surface of the film, records the pattern of light striking the film. The film then can be processed to generate an image of the object. In recent years, electronic imaging sensors, such as charge couple devices (CCDs), have provided an alternative technique for generating an image of an object. For example, a digital camera may include a lens that focuses light generated and/or reflected by an object on an electronic image sensor (rather than film), and the electronic image sensor records the pattern of light striking the sensor by generating a pattern of charges corresponding to the pattern of light striking the sensor.

Imaging techniques using electronic imaging sensors may be advantageous over certain conventional techniques for a number of reasons, including the elimination of the need to process and replace film. In certain applications, these advantages may be particularly important. For example, electronic imaging sensors may allow Earth-orbiting satellites to have on-board cameras for generating images of earth, an application that may be difficult or impossible using conventional imaging techniques (as there would be great difficulty in processing and replacing film for a camera on-board an Earth-orbiting satellite).

SUMMARY

According to the present invention, disadvantages and problems associated with conventional imaging devices and methods can be reduced or eliminated.

In certain embodiments, an imaging device includes an image sensor that includes a detector array. The detector array includes a plurality of detectors operable to receive a charge generated by light. The detector array also includes a plurality of detector sub-arrays each including one or more of the plurality of detectors. The one or more detectors of each detector sub-array are in a time delay and integration (TDI) configuration. The image sensor of the imaging device is operable to, for each of the plurality of detector sub-arrays of the detector array, generate an image signal corresponding to a scan of an object.

Particular embodiments of the present invention may provide one or more technical advantages. Conventional image sensors (e.g., charge couple devices (CCDs)) may include a number of detector arrays (e.g., rows of detectors) each including a number of detectors in a TDI configuration. An image signal corresponding to a scan of an object (e.g., a time delayed and integrated charge) may be extracted from the detector array after charge transfer has occurred between each of the detectors of the detector array, as each of the detector of the detector array are in a TDI configuration. Thus, in a conventional image sensor with detector arrays having sixty-four detectors in a TDI configuration, charge transfer must occur sixty-four times before an image signal is extracted that may be used to generate an image of the object.

In contrast, certain embodiments of the present invention may provide an image sensor that includes a number of detector arrays each including a number of detectors, the detectors of each detector array being divided into a number of detector sub-arrays. The detectors of each detector sub-array may be in a TDI configuration such that an image signal (i.e., a time delayed and integrated charge) may be extracted from each detector sub-array of a detector array (as opposed to the entire detector array). As a result, charge transfer may occur between each of the detectors of a detector sub-array rather than each of the detectors of the entire detector array. Image data (e.g., an analog or digital representation of an image signal) corresponding to the image signals from each detector sub-array of a detector array may be combined to generate combined image data, which may be used to generate an image of the object being scanned. Thus, certain embodiments of the present invention may provide an image sensor having the same total number of detectors per detector array as compared to conventional image sensors (thereby maintaining the same low-light imaging capability) while reducing the number of detectors in a TDI configuration.

As a result of having fewer detectors in a TDI configuration, certain embodiments of the present invention may provide an image sensor having an increased overall charge transfer efficiency (overall charge transfer efficiency=(individual charge transfer efficiency)×(number of detectors in TDI)) relative to conventional image sensors. Because the individual charge transfer efficiency (efficiency of transfer between two detectors in TDI) may be less than one hundred percent, reducing the number of detectors in a TDI configuration while maintaining the same total number of detectors per detector array may provide increased overall charge transfer efficiency of a detector array while maintaining the same low-light imaging capability.

Having fewer detectors in a TDI configuration may provide an image sensor having an increased operational life relative to conventional image sensors. As a particular example, in certain applications, an image sensor may be exposed to a radiation environment. For example, image sensors used in satellite imaging applications may be exposed to the radiation environment of space. A radiation environment may decrease individual charge transfer efficiency over time, and the image sensor may need to be replaced when the overall charge transfer efficiency falls below a certain point. By reducing the number of detectors in a TDI configuration, individual charge transfer efficiency has less effect on overall charge transfer efficiency. As a result, individual charge transfer efficiency may decrease to a lower level before the overall charge transfer efficiency reaches the point at which the sensor needs to be replaced. Thus, the amount of time the sensor can be exposed to a radiation environment before replacement is necessary may be increased.

An image sensor having fewer detectors in a TDI configuration may require less voltage to operate relative to certain conventional image sensors. The amount of voltage needed to manipulate the gates of the detectors such that a charge may be passed between adjacent detectors may increase as the amount of charge to be passed increases. By reducing the number of detectors in a TDI configuration, the largest accumulated charge passed between any two detectors in may be reduced, thereby reducing the amount of voltage needed to manipulate the gates to pass the charge.

By decreasing the voltage needed to pass a charge between detectors, the image sensor of certain embodiments of the present invention may be hybridized to an integrated circuit (e.g., a read-out integrated circuit (ROIC) having complementary metal-oxide-semiconductor (CMOS) circuitry), and the integrated circuit may provide the voltages to manipulate the gates directly via an interconnect located at any point in the image sensor (rather than having a separate power source apply voltages from either end of a particular gate, as in conventional image sensors). As a result, higher fidelity signals may be applied to the gates of detectors in detector arrays located near the center of the image sensor, thereby increasing the individual charge transfer efficiency of those detectors as compared to conventional image sensors.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1A:
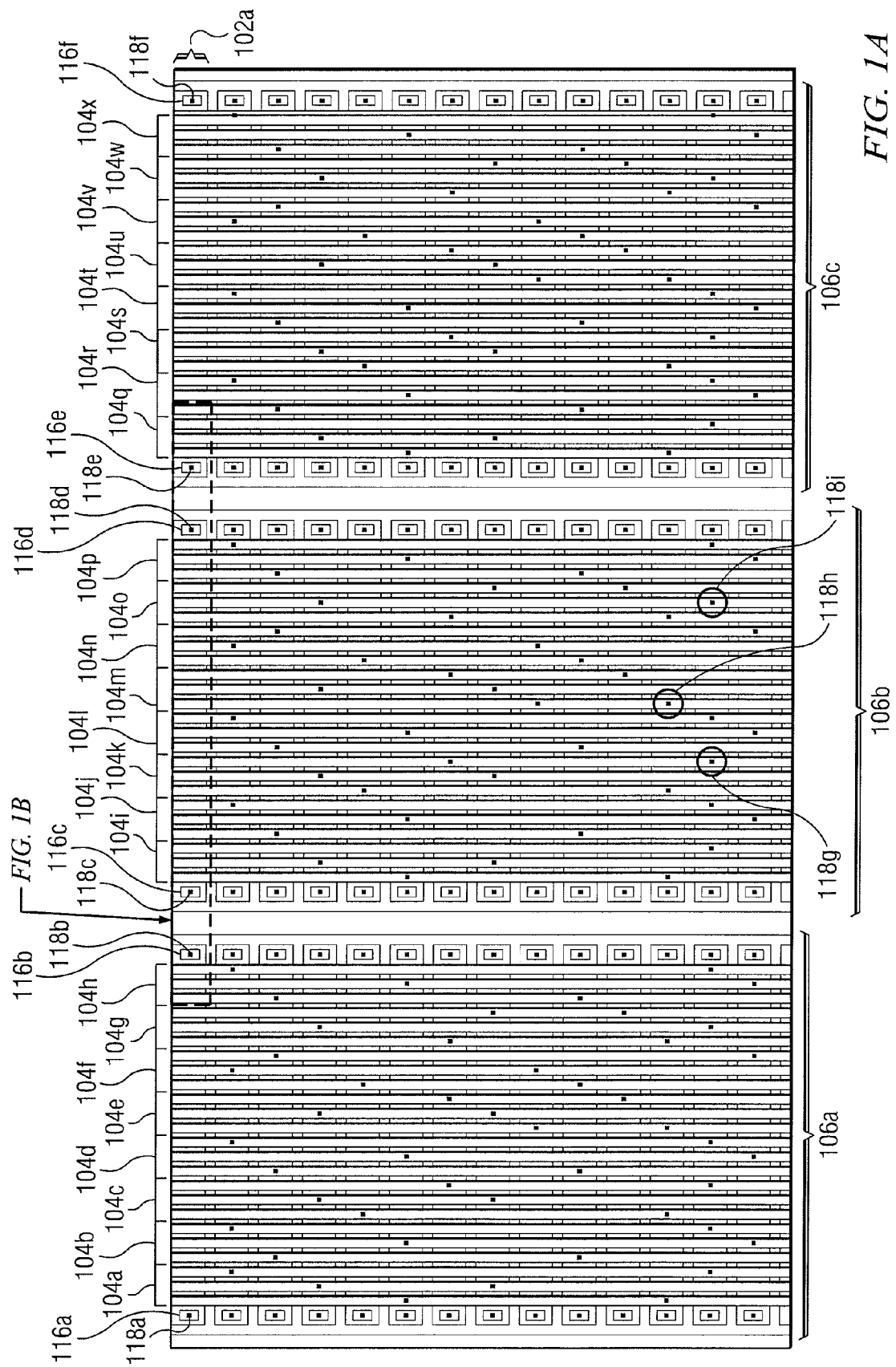
FIGS. 1A-1C illustrate notional top and cross-sectional views of an example image sensor, according to certain embodiments of the present invention.
Figure 1B:
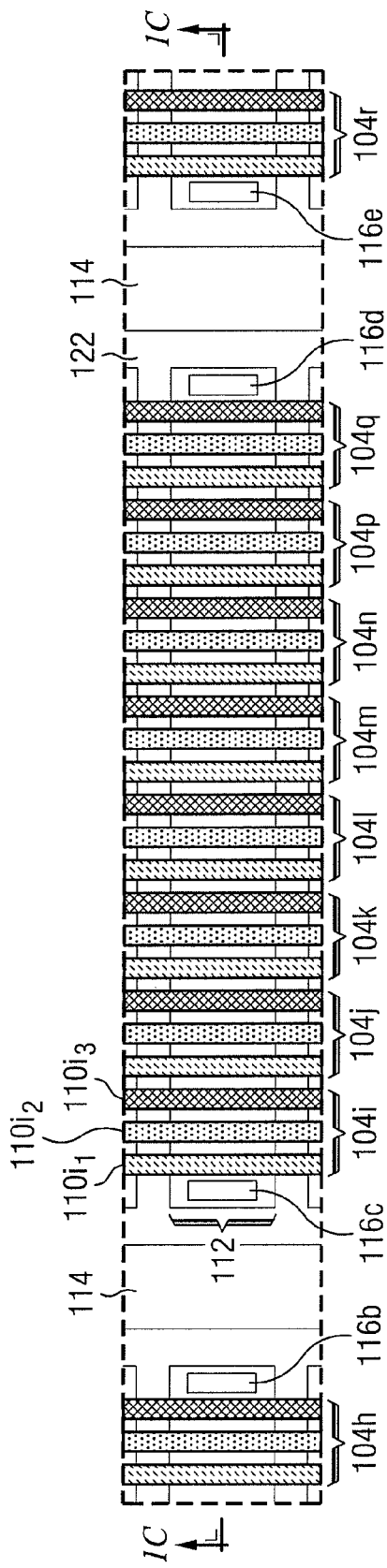
Figure 1C:
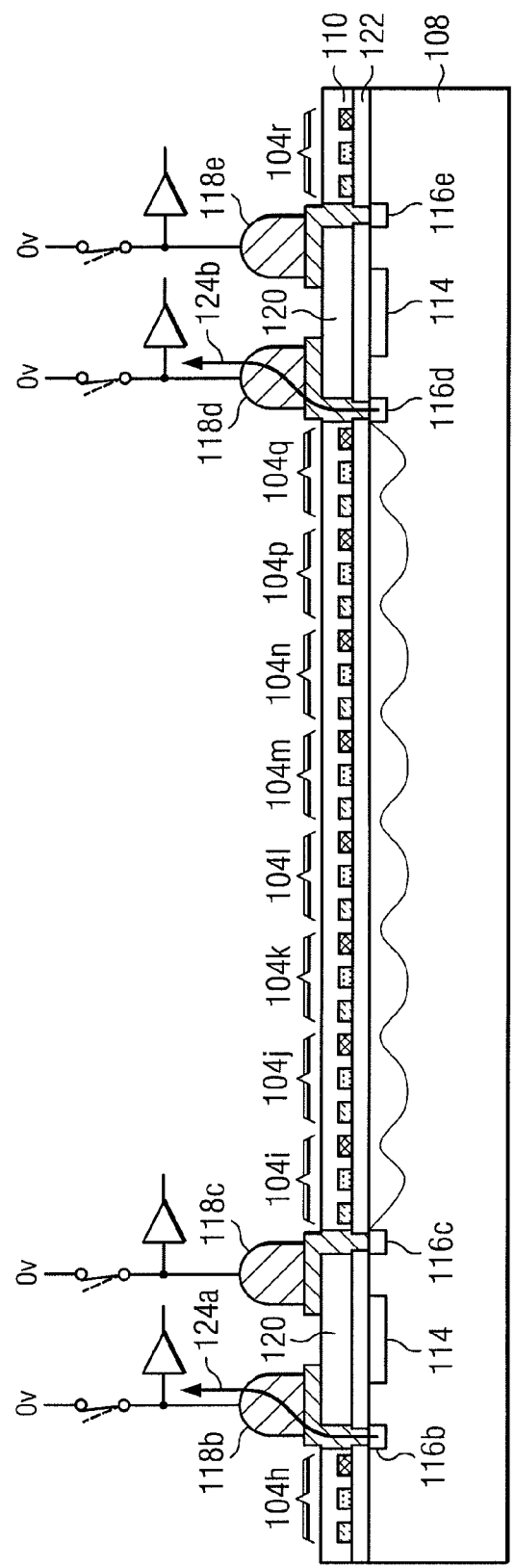

FIGS. 1A-1C illustrate top and cross-sectional views of an example image sensor 100, according to certain embodiments of the present invention. Image sensor 100 may include one or more detector arrays 102. Each detector array 102 may include one or more detectors 104. Each detector array 102 may further include one or more detector sub-arrays 106, each detector sub-array 106 of a particular detector array including one or more of the detectors 104 of the particular detector array 102. Although image sensor 100 is illustrated and primarily described as including a particular number of particular components, the present invention contemplates any image sensor 100 including any suitable number of any suitable components, according to particular needs.

In general, image sensor 100 is operable to generate an image signal corresponding to a scan of an object. Each detector sub-array 106 of a particular detector array 102 may be operable to generate an image signal corresponding to a scan of an object. Each image signal may comprise a time-delayed and integrated charge received by the one or more detectors 104 of each detector sub-array 106, the charges corresponding to light reflected and/or generated by the scanned object. An object may include a person, place, thing, or any other suitable entity or entities.

In certain embodiments, image sensor 100 is a back-side illuminated CCD (as illustrated in the examples of FIGS. 1A-1C) comprising a photoactive region 108, gates 110, channels 112, guard implants 114, TDI diffusions 116, interconnects 118. Although image sensor 100 is illustrated and primarily described as a back-side illuminated CCD having particular components, the present invention contemplates image sensor 100 being any suitable image sensor having any suitable components operable to receive a charge generated by light and generate an image signal corresponding to a scan of an object. For example, in addition to a back-side illuminated CCD, image sensor 100 could be a front-side illuminated CCD, such as a backside illuminated bucket brigade device, or any other suitable imaging sensor.

Photoactive region 108 of image sensor 100 may comprise a photosensitive material that generates charge from incident photons through the photoelectric effect. In certain embodiments, photoactive region 108 comprises an epitaxial layer of silicon grown upon a substrate material and having a doping of p+ (Boron). In certain other embodiments, photoactive region 108 comprises an epitaxial layer of silicon grown upon a substrate material and having a doping of n+ (arsenic). Although photoactive region 108 is described as comprising an epitaxial layer of silicon having a particular doping, the present invention contemplates photoactive region 108 comprising an epitaxial layer of silicon having any suitable doping, according to particular needs.

Gates 110 of image sensor 100 may form the detectors 104 of each detector array. In certain embodiments, gates 110 may be polysilicon gates deposited on photoactive region 108 patterned with photolithography, the gates 108 being etched such that they lie perpendicular to the channels 108 (described below) defining detector arrays 102.

Image sensor 100 may have a particular gate structure in which a group of gates 110 form a single detector 104 of each detector array 102. For example, as illustrated in FIGS. 1A-1C, image sensor 100 may have a three-phase gate structure wherein a group of three gates form a single detector 104 of each detector array 102. Although image sensor 100 is depicted and primarily described as having a three-phase gate structure, the present invention contemplates image sensor 100 having any suitable gate structure, according to particular needs.

The gate structure forming each detector 104 may allow each detector 104 to receive a charge generated by light (e.g., photons) passing through photoactive region 108, the amount of charge corresponding to the intensity of the light passing through photoactive region 108. For example, detector 104$i$ may comprise gates 110$i_1$, 110$i_2$, and 110$i_3$. By applying a voltage (e.g., six volts) to gates 110$i_1$ and 110$i_3$ via an interconnect 118 (described in further detail below) with no voltage being applied to gate 110$i_2$, the positive charge generated by the light passing through a portion of photoactive region 108 corresponding to detector 104$i$ may collect and remain at the area of lower charge (i.e., gate 110$i_2$).

Manipulating the voltages applied the gates 110 forming each of the detectors 104 of a particular detector sub-array 106 may allow a collected charge to be passed from one detector (e.g., detector 104$i$) to an adjacent detector (e.g., 104$j$) of a particular detector sub-array 106. Furthermore, the voltages applied to the gates 110 forming each of the detectors 104 of a particular detector sub-array 106 may be manipulated in such a manner as to allow a received charge to be passed from one detector 104 to an adjacent detector 104 of a particular detector sub-array 106 synchronously with the movement of an object being scanned relative to image sensor 100. In other words, the voltages applied to the gates 110 forming each of the detectors 104 of a particular detector sub-array 106 may be manipulated in such a manner as to allow each of the detectors 104 of a detector sub-array 106 may be in a TDI configuration. Reference to movement of an object being scanned relative to image sensor 100 or to movement of image sensor 100 relative to an object being scanned may include movement of the object relative to image sensor 100, movement of image sensor 100 relative to the object, or movement of both the object and image sensor 100 relative to one another.

For example, detector 104$i$ may receive a charge generated by a first photon generated and/or reflected by a particular point (or region) on an object being scanned. The received charge generated by the first photon may be passed from detector 104$i$ to detector 104$j$ as detector 104$j$ receives a charge generated by a second photon generated and/or reflected by the same particular point (or region) on the object being scanned (e.g., as the particular portion of the object being scanned has moved relative to image sensor 100 from a position corresponding to detector 104$i$ to a position corresponding to detector 104$j$). Thus, as each detector 104 of a detector sub-array 106 receives a charge generated by a photon generated and/or reflected by the same particular point (or region) on the object being scanned, the charges accumulate, thereby increasing the low-light imaging capability of image sensor 100. A low-light imaging capability may be particularly important in certain applications (e.g., earth imaging satellites).

Channels 112 of image sensor 100 may define the path (i.e., channel) along which a received charge may be passed between detectors 104 of a detector array 106 to generate the time-delayed and integrated charge (i.e., the image signal), as described above. In certain embodiments, channels 112 may be formed by ion-implanting certain regions (e.g., region 122) of the surface of photoactive region 108 with phosphorous (giving the region an n-doped designation). Ion-implanted regions 122 may prevent the passage of a charge, thereby defining the path (i.e., channel 112) along which a charge may be passed. Additionally, ion-implanted regions 122 may form channel stops that define the plurality of detector arrays 102 within photoactive region 108 (i.e., ion-implanted regions form a barrier separate adjacent detector arrays 102 from one another).

Guard implants 114 of image sensor 100 may provide separation between adjacent detector sub-arrays 106 of a detector array 102, preventing any time delayed and integrated charge of a generated image signal 124 not extracted from a detector sub-array 106 at a TDI diffusion 116 (described in further detail below) from passing to an adjacent detector sub-array 106. In certain embodiments, guard implants 114 are connected to a bypass at the edge of image sensor 100 such that any charge not extracted at a TDI diffusion 116 is conducted to the bypass and then to ground.

Each TDI diffusion 116 of image sensor 100 may be associated with a particular detector sub-array 106 (e.g., located on either side of a particular detector sub-array) and may be operable to collect the image signal 124 (i.e., time delayed and integrated charge) generated by the plurality of detectors 104 of the particular sub-array 106. More particularly, the image signal 124 (i.e., time delayed and integrated charge) generated by the detectors 104 of a detector sub-array 106 may be passed from the last detector 104 of a detector sub-array 106 (e.g., detector 104$i$ or detector 104$q$ of detector sub-array 106$b$) to a corresponding TDI diffusion 116 (e.g., TDI diffusion 116$c$ or TDI diffusion 116$d$ depending upon the direction of the scan) such that the image signal 124 may be extracted from image sensor 102 via an interconnect 118. Furthermore, because a TDI diffusion 116 may be located on either side of each detector sub-array 106, each detector sub-array 106 may be operable to generate an image signal 124 corresponding to a scan of an object as the object moves in either direction relative to image sensor 100 (i.e., image sensor 100 may be operable to scan left of right).

Sensor interconnects 118 of image sensor 100 may provide electrical connection points between image sensor 100 and other components of an imaging device. For example, sensor interconnects 118 may be soft metal interconnects coupled to a corresponding circuit interconnect 204 of integrated circuit 202 of imaging device 200 (as described in further detail with regard to FIG. 2). Furthermore, sensor interconnects 118 may each be insulated from the underlying structure (described above) by an insulating region 120 (e.g., a silicon dioxide layer). Although a particular type of sensor interconnect 118 is illustrated and primarily described, the present invention contemplates any suitable type of sensor interconnect 118, according to particular needs.

Certain sensor interconnects 118 of image sensor 100 (e.g., sensor interconnects 118$a$-$f$ shown in FIG. 1A) may provide electrical connection points to image sensor 100 such that image signals 124 may be communicated to/accessed by other components of an imaging device (e.g., integrated circuit 202 of imaging device 200, as described in further detail below) via sensor interconnects 118. For example, each TDI diffusion 116 may be associated with a sensor interconnect 118 such that image signals 124 collected by a TDI diffusion 116 may be communicated to circuitry 206 of integrated circuit 202 (described in further detail below with regard to FIG. 2) via the corresponding sensor interconnect 118.

Certain sensor interconnects 118 of image sensor 100 (e.g., sensor interconnects 118$g$-$i$ shown in FIG. 1A) may provide electrical connection points to image sensor 100 such that a voltage may be applied to each gate 110 of image sensor 100, which may allow the detectors 104 of a detector sub-array 106 to be in a TDI configuration (as described above). For example, circuitry 206 of integrated circuit 202 (described in further detail below with regard to FIG. 2) may be operable to provide varying voltages to each of the gates 110 of a detector array 102 such that the detectors 104 of each detector sub-array 106 of the detector array 102 may be in a TDI configuration (as described above).

Each gate 110 may have at least one associated sensor interconnect 118 such that a voltage may be applied to each gate 110. Furthermore, because each gate 110 may form a portion of multiple detectors 104 of an image sensor 100 (e.g., a single detector 104 in each detector array 102), each gate 110 of a particular detector array 102 may not have an associated sensor interconnect 118, as the associated sensor interconnect 118 may be on a portion of the gate located in another detector array 102. In certain embodiments, each gate 110 may have a plurality of associated sensor interconnects 118, which may provide a back-up mechanism in the event that one of the associated sensor interconnects 118 of a gate 110 fails.

Although a particular number of components of system 100 have been illustrated and primarily described, the present invention contemplates system 100 including any suitable number of such components.

In operation of an example embodiment of image sensor 100, detector 104a of detector sub-array 106a of detector array 102a may receive a first charge generated by light generated/reflected by a particular point (or region) on an object being scanned. The voltages applied to the gates 110 of detector 104a and detector 104b may be manipulated such that the first charge received by detector 104a may be passed to detector 104b synchronously with the movement of the particular point (or region) on the object being scanned relative to image sensor 100. Thus, the first charge arrives at detector 104b at approximately the same time as a second charge generated by light generated/reflected by the particular point (or region) on an object being scanned is received by detector 104b. The first and second charges may then be passed to detector 104c as detector 104c received a third charge generated by light generated/reflected by the particular point (or region) on an object being scanned and so on until the accumulated charge (first through eighth charges) arrives at detector 104h. The accumulated charge (i.e., image signal 124a) may be passed from detector 104h to TDI diffusion 116b. TDI diffusion 116b may pass image signal 124a to interconnect 118c such that image signal 124a may pass from sensor 100 to other components of an imaging device that may store image signal 124a (e.g., integrated circuit 202 if imaging device 200, as described below with regard to FIG. 2).

Detector 104i of detector sub-array 106b may receive a ninth charge generated by the particular point (or region) on the object being scanned, pass the received ninth charge to detector 104j, and so on until the accumulated charge (ninth through sixteenth charges) arrives at detector 104q. The accumulated charge (i.e., image signal 124b) may be passed from detector 104j to TDI diffusion 116d. TDI diffusion 116d may pass image signal 124b to interconnect 118d such that image signal 124b may pass from sensor 100 to other components of an imaging device that may store image signal 124b (e.g., integrated circuit 202 if imaging device 200, as described below with regard to FIG. 2).

Detector 104r of detector sub-array 106b may receive a seventeenth charge generated by the particular point (or region) on the object being scanned, pass the received seventeenth charge to detector 104s, and so on until the accumulated charge (seventeenth through twenty-fourth charges) arrives at detector 104x. The accumulated charge (i.e., image signal 124c) may be passed from detector 104x to TDI diffusion 116f. TDI diffusion 116f may pass image signal 124c to interconnect 118f such that image signal 124c may pass from sensor 100 to other components of an imaging device that may store the third image signal (e.g., integrated circuit 202 of imaging device 200, as described below with regard to FIG. 2).

Image data corresponding to image signals 124a-c may be combined such that an image of the particular point (or region) on the object being scanned may be generated. Thus, charge is accumulated by each of the twenty four detectors of detector array 102a (increasing the low-light imaging capability of detector array 102a) while only eight detectors (the eight detectors of each sub-array 106a-c) are in a TDI configuration.

As a particular example, image sensor 100 may be incorporated into an Earth-imaging satellite operable to generate images of the Earth's surface as the Earth-imaging satellite orbits above the earths surface. A particular detector 104 of detector sub-array 106 may receive a charge generated by light reflected by a first point (or region) on the portion of the Earth's surface being scanned. Because detectors 104 of the detector sub-array 106 are in a TDI configuration, the particular detector 104 may pass the generated charge to a neighboring detector 104 synchronously with the movement of the first point (or region) on the portion of the Earth's surface being scanned relative to image sensor 100. Furthermore, once the generated charge is passed, the particular detector 104 may generate a second charge corresponding to a second point (or region) on the portion of the Earth's surface being scanned as the neighboring detector 104 generates a third charge corresponding to the first point (or region) on the portion of the Earth's surface being scanned. The first detector 104 may pass the second charge to the neighboring detector 104 as the neighboring detector passes the first and third charges to its neighboring detector 104, and so on.

In other words, each detector sub-array 106 may generate a series of image signals 124 corresponding to successive points on the portion of the Earth's surface being scanned, each image signal 124 being a time-delayed and integrated charge corresponding to a point (or region) on the portion of the Earth's surface being scanned. Image data corresponding to the series of image signals 124 may be used to generate an image of the successive points on the portion of the Earth's surface being scanned. Because each image signal 124 is a time-delayed and integrated charge generated by the detectors 106 of the detector sub-array 106, low-light imaging capability (which may be important in Earth imaging applications) may be increased. Furthermore, because image data corresponding to each image signal 124 of the generated series of image signals 124 is combined with image data corresponding to corresponding image signals 124 generated by other detector sub-arrays 106 of a detector array 102, low-light imaging capabilities may be further increased without increasing the number of detectors in a TDI configuration.

It should be understood that the example described above is for example purposes only and should not be used to limit the present invention.

Particular embodiments of the present invention may provide one or more technical advantages. Conventional image sensors (e.g., charge couple devices (CCDs)) may include a number of detector arrays (e.g., rows of detectors) each including a number of detectors in a TDI configuration. An image signal corresponding to a scan of an object (e.g., a time delayed and integrated charge) may be extracted from the detector array after charge transfer has occurred between each of the detectors of the detector array, the detectors of the detector array are in a TDI configuration. Thus, in a conventional image sensor with detector arrays having sixty-four detectors in a TDI configuration, charge transfer must occur sixty-four times before an image signal 124 is extracted that may be used to generate an image of the object.

In contrast, certain embodiments of the present invention may provide an image sensor 100 that includes a number of detector arrays 102 each including a number of detectors 104, the detectors 104 of each detector array 102 being divided into a number of detector sub-arrays 106. The detectors 104 of each detector sub-array 106 may be in a TDI configuration such that an image signal 124 (i.e., a time delayed and integrated charge) may be extracted from each detector sub-array 106 of a detector array 102 (as opposed to the entire detector array 102). As a result, charge transfer may occur between each of the detectors 104 of a detector sub-array 106 rather than each of the detectors 104 of the entire detector array 102. Image data (e.g., an analog or digital representation of an image signal 124) corresponding to the image signals 124 from each detector sub-array 106 of a detector array 102 may be combined to generate combined image data, which may be used to generate an image of the object being scanned. Thus, certain embodiments of the present invention may provide an image sensor 100 having the same total number of detectors 104 per detector array 102 as compared to conventional image sensors (thereby maintaining the same low-light imaging capability) while reducing the number of detectors 104 in a TDI configuration.

As a result of having fewer detectors 104 in a TDI configuration, certain embodiments of the present invention may provide an image sensor 100 having an increased overall charge transfer efficiency (overall charge transfer efficiency= (individual charge transfer efficiency)×(number of detectors in TDI)) relative to conventional image sensors. Because the individual charge transfer efficiency (efficiency of transfer between two detectors in TDI) may be less than one hundred percent, reducing the number of detectors 104 in a TDI configuration while maintaining the same total number of detectors 104 per detector array 102 may provide increased overall charge transfer efficiency of a detector array 102 while maintaining the same low-light imaging capability.

Having fewer detectors 104 in a TDI configuration may provide an image sensor 100 having an increased operational life relative to conventional image sensors. As a particular example, in certain applications, an image sensor may be exposed to a radiation environment. For example, image sensors used in satellite imaging applications may be exposed to the radiation environment of space. A radiation environment may decrease individual charge transfer efficiency over time, and the image sensor may need to be replaced when the overall charge transfer efficiency falls below a certain point. By reducing the number of detectors 104 in a TDI configuration, individual charge transfer efficiency has less effect on overall charge transfer efficiency. As a result, individual charge transfer efficiency may decrease to a lower level before the overall charge transfer efficiency reaches the point at which the image sensor needs 100 to be replaced. Thus, the amount of time image sensor 100 can be exposed to a radiation environment before replacement is necessary may be increased relative to certain conventional sensors.

Because image sensor 100 may have fewer detectors 104 in a TDI configuration, image sensor 100 may require less voltage to operate relative to certain conventional image sensors. The amount of voltage needed to manipulate the gates 110 of the detectors 104 such that a charge may be passed between adjacent detectors 104 may increase as the amount of charge to be passed increases. By reducing the number of detectors 104 in a TDI configuration, the largest accumulated charge passed between any two detectors 104 may be reduced, thereby reducing the amount of voltage needed to manipulate the gates 110 to pass the charge.

By decreasing the voltage needed to pass a charge between detectors 104, image sensor 100 of certain embodiments of the present invention may be hybridized to an integrated circuit 202 (e.g., a read-out integrated circuit (ROIC) having complementary metal-oxide-semiconductor (CMOS) circuitry 206, as described below with regard to FIG. 2). The integrated circuit 202 may provide the voltages to manipulate the gates 110 directly via a sensor interconnect 118 located at any point in the image sensor 100 (rather than having a separate power source apply voltages from either end of a particular gate, as in conventional image sensors). As a result, higher fidelity signals may be applied to the gates 110 of detectors 104 in detector arrays 102 located near the center of the image sensor 100, thereby increasing the individual charge transfer efficiency of those detectors 104 as compared to conventional image sensors.

Figure 2:
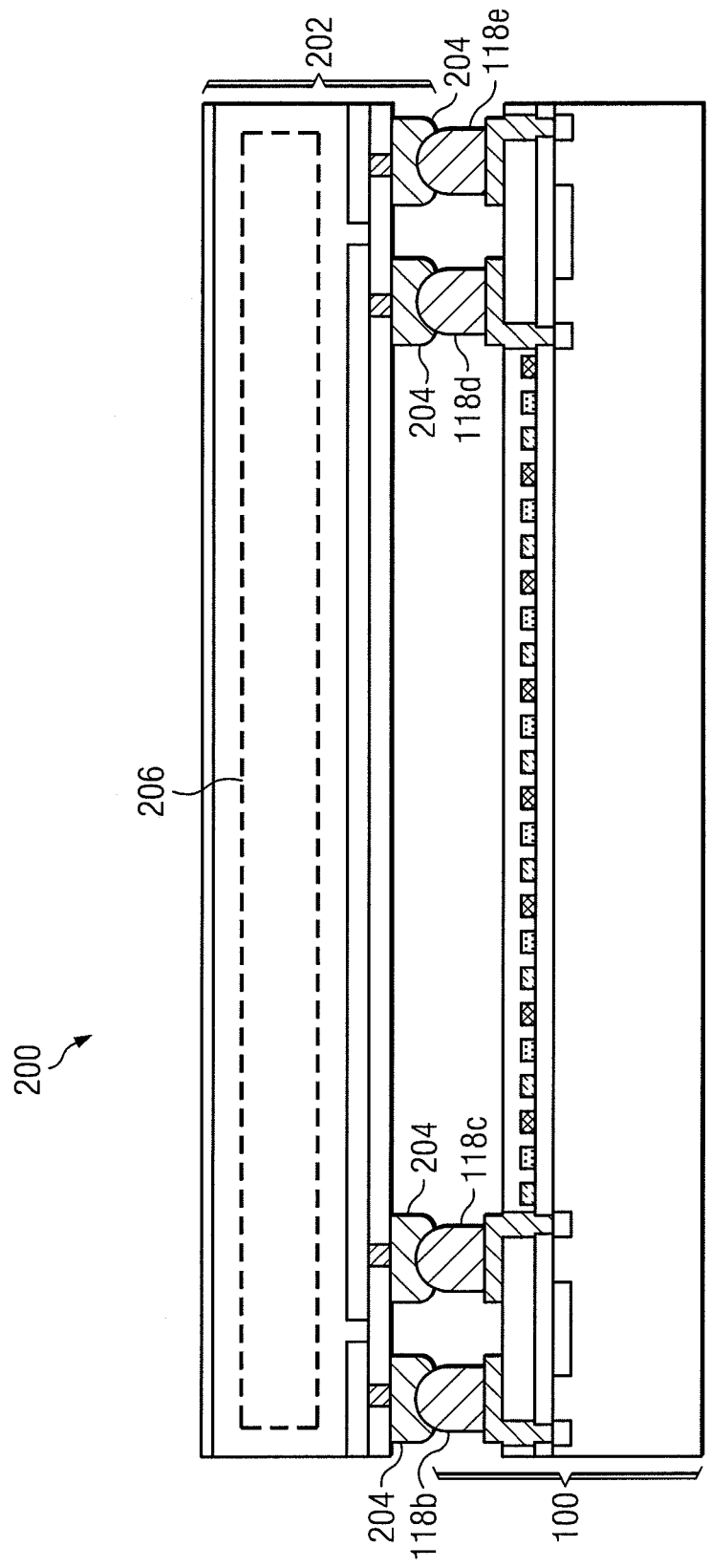
FIG. 2 illustrates an example imaging device including an image sensor coupled to an integrated circuit, according to certain embodiments of the present invention.

FIG. 2 illustrates an example imaging device 200 including an image sensor 100 coupled to integrated circuit 202, according to certain embodiments of the present invention. Integrated circuit 202 of imaging device 200 may comprise a plurality of circuit interconnects 204 and circuitry 206. For example, circuitry 206 may be CMOS circuitry. For simplicity, circuitry 206 will be referred to CMOS circuitry 206 throughout the remainder of this description, although the present invention contemplates circuitry 206 being any suitable circuitry operable to perform the functions described below. Example configurations of CMOS circuitry 206 are depicted in FIGS. 3A-3B and FIGS. 4A-4B, described in further detail below.

Circuit interconnects 204 of integrated circuit 202 may provide electrical connection points to integrated circuit 202. For example, circuit interconnects 204 may be soft metal interconnects coupled to a corresponding sensor interconnect 118 of image sensor 100. Although a particular type of circuit interconnect 204 is illustrated and primarily described, the present invention contemplates any suitable type of circuit interconnect 204, according to particular needs.

Certain circuit interconnects 204 of integrated circuit 202 may provide electrical connection points between integrated circuit 202 and sensor interconnects 118 corresponding to TDI diffusions 116 of sensor 100 such that image signals 124 generated by sub-arrays 106 and collected at TDI diffusions 116 may be communicated to/accessed by integrated circuit 202 via sensor interconnects 118. For example, circuit interconnects 204b-204e may be in electrical contact with sensor interconnects 118b-120e, respectively.

Although not illustrated in FIG. 2, certain circuit interconnects 204 of integrated circuit 202 may provide electrical connection points between integrated circuit 202 and sensor interconnects 118 corresponding to gates 110 of image sensor 100 (e.g., sensor interconnects 118g-120i, illustrated in FIG. 1A) such that CMOS circuitry 206 may apply a voltage to each gate 110 of image sensor 100, which may allow the detectors 104 of a detector sub-array 106 to be in a TDI configuration (as described above).

CMOS circuitry 206 of integrated circuit 204 may be operable to receive (via TDI diffusions 116, sensor interconnects 118, and circuit interconnects 204) image signals 124 generated by each detector sub-array 106 of a particular detector array 102 of image sensor 100, the received image signals 124 being a time delayed and integrated charge corresponding to a particular portion of an object being scanned.

CMOS circuitry 206 may be further operable to store image data corresponding to the received image signals 124 from each detector sub-array 106 of a detector array 102. In certain embodiments, the stored image data may be analog data corresponding to the received image signal 124. In certain other embodiments, the stored image data may be a digital representation of analog data corresponding to the received image signal 124.

Having stored image data has been corresponding to an image signal 124 received from each detector sub-array 106 of a particular detector array 102, CMOS circuitry 206 may be further operable to combine the stored image data to generate combined image data. The combined image data may be outputted for the generation of an image of the particular portion of the object being scanned.

Figure 3A:
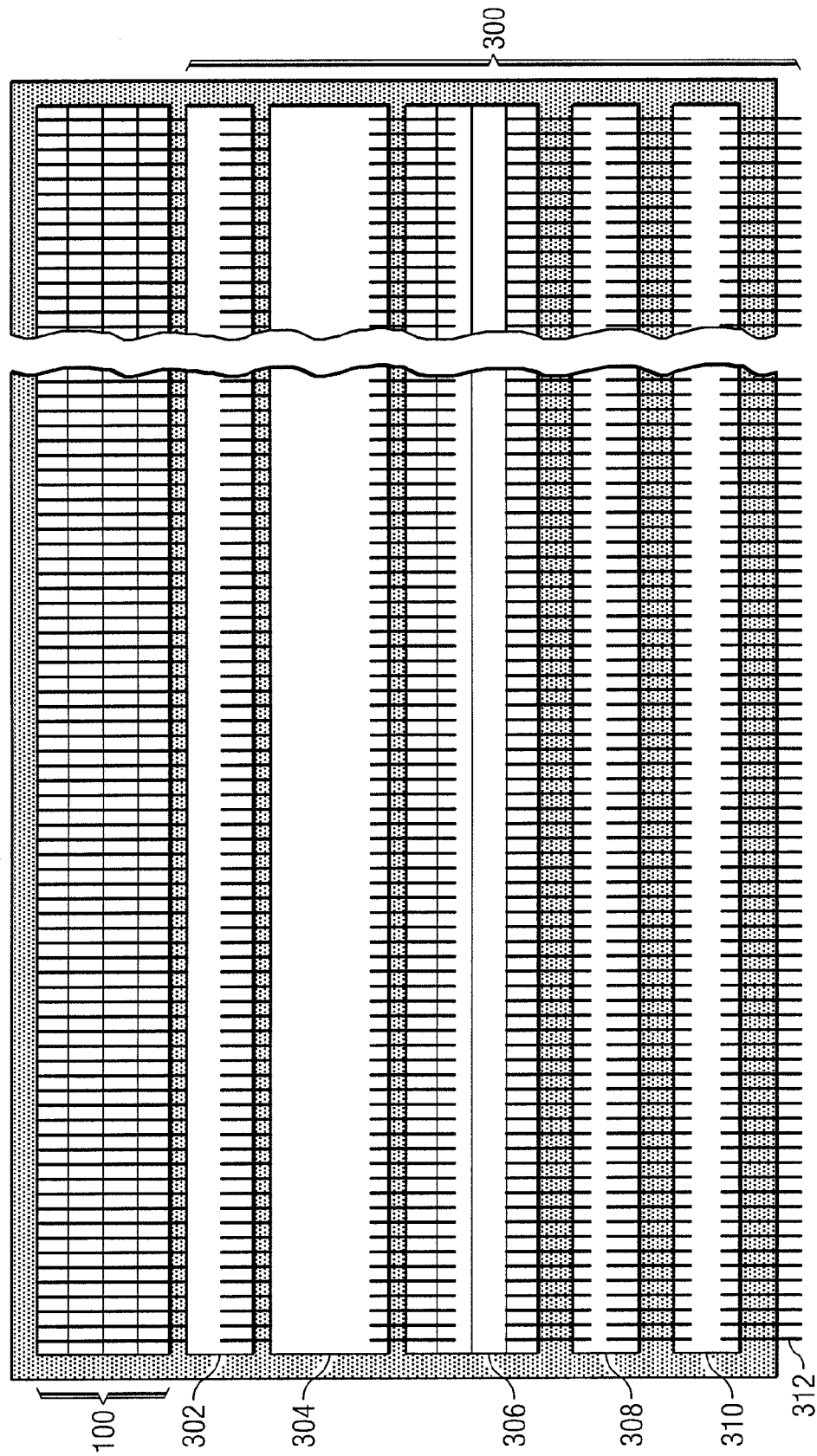
FIGS. 3A-3B illustrate an example configuration of CMOS circuitry components of an integrated circuit coupled to an image sensor, according to certain embodiments of the present invention.
Figure 3B:
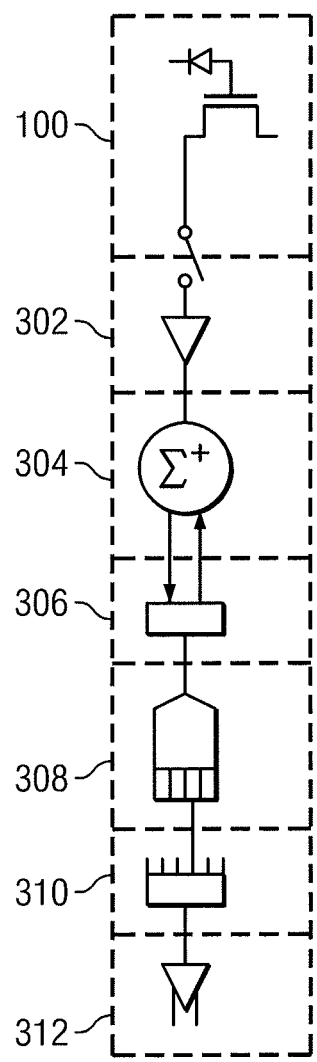

FIGS. 3A-3B illustrate an example configuration 300 of components of CMOS circuitry 206 of integrated circuit 202 coupled to image sensor 100, according to certain embodiments of the present invention. CMOS circuitry 206 may receive image signals 124 (e.g., a time delayed and integrated charge corresponding to a scan of a particular portion of a scanned object) from each detector sub-array 106 of a detector array 102 of image sensor 100, as described above. The image signals 124 first pass through a ping-pong column buffer 302. For example, ping-pong column buffer 302 may be a 320 K Ips ping-pong column buffer.

Image data corresponding to the received image signals 124 (i.e., an analog representation of the received image signals 124) may then be stored in storage and TDI adder 304. Storage and TDI adder 304 may store image data corresponding to received image signals 124 until image data has been stored corresponding to an image signal 124 received from each detector sub-array 106 of a particular detector array 102 of image sensor 100. Storage and TDI adder 304 may then combine the stored image data corresponding the received image signals 124 from each of the detector sub-arrays of the particular detector array 102 to generate combined image data (i.e., an analog representation of the summation of each of the image signals 124 of the particular detector array).

The combined image data may then be converted from an analog signal (e.g., a voltage) to a digital signal by analog-to-digital (A/D) converter 306. The digital combined image data may then be passed to encoder 308, low-voltage differential signaling (LVDS) drivers 310, and output via LVDS outputs 312. The output digital combined image data may then be used to generate an image of the particular portion of the scanned object.

Figure 4B:
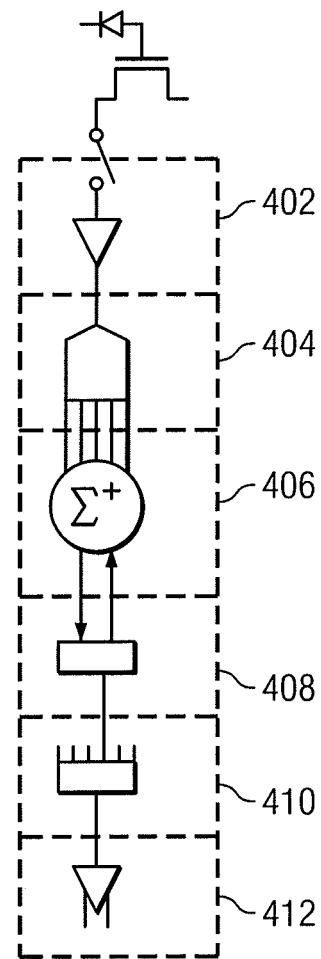
FIGS. 4A-4B illustrate an example configuration of CMOS circuitry components of an integrated circuit coupled to an image sensor, according to certain embodiments of the present invention.
Figure 4A:
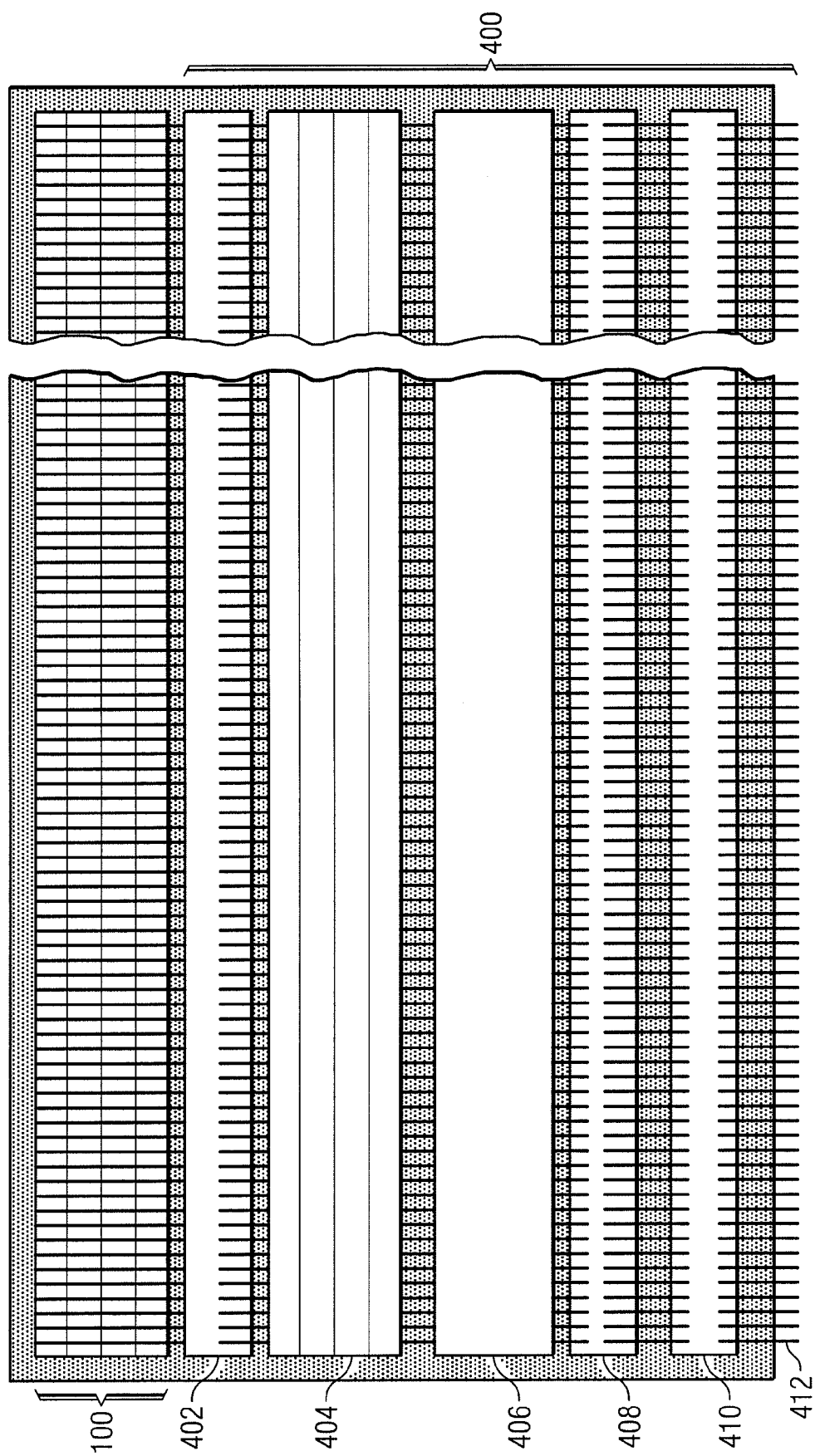
Figure 5A:
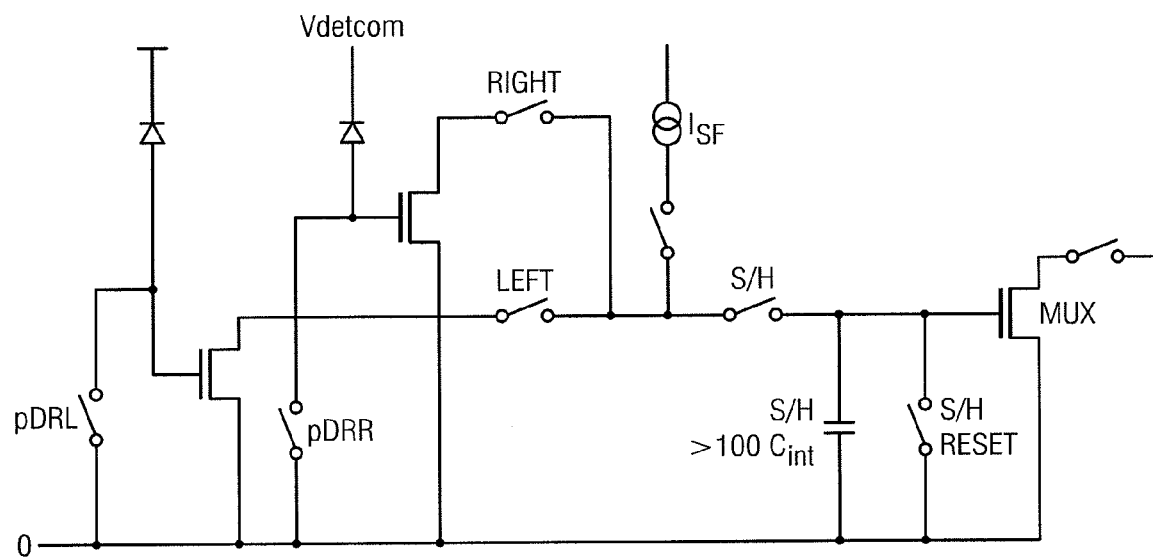
FIGS. 5A-5B illustrate example notional configurations of CMOS circuitry and associated timing that may permit the direction, in which the example image sensor of FIGS. 1A-1C generates an image signal corresponding to a scan of an object, to be changed, according to certain embodiments of the present invention.
Figure 5B:
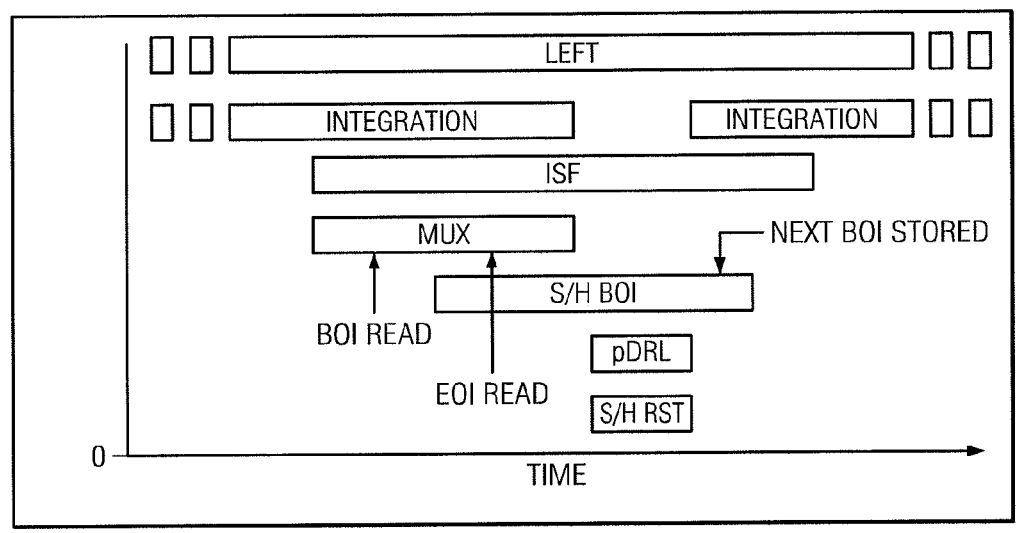
Figure 6A:
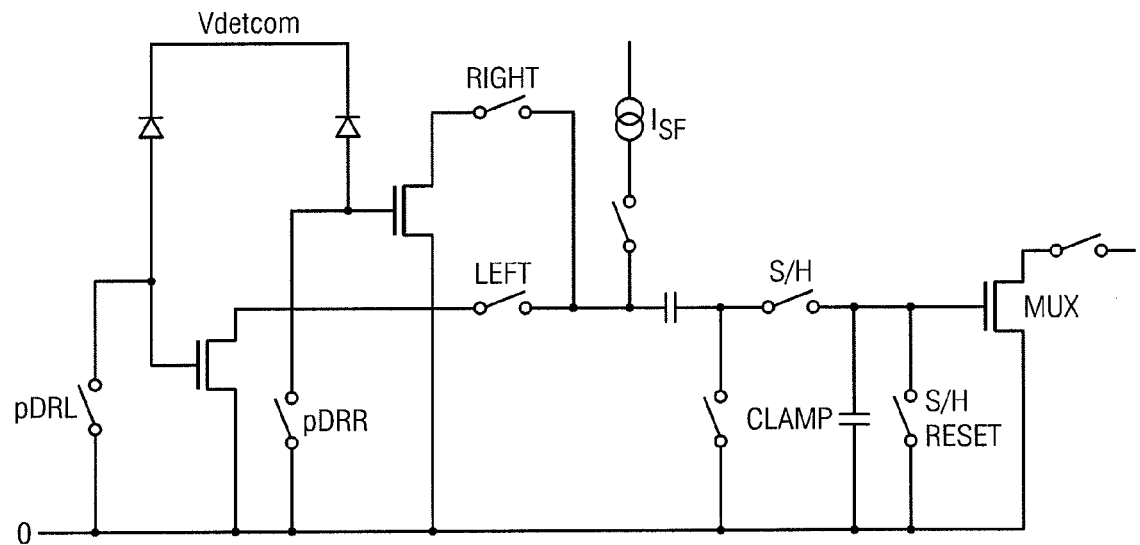
FIGS. 6A-6B illustrate example alternative notional configurations of CMOS circuitry and associated timing that may permit the direction, in which the example image sensor of FIGS. 1A-1C generates an image signal corresponding to a scan of an object, to be changed, according to certain embodiments of the present invention.
Figure 6B:
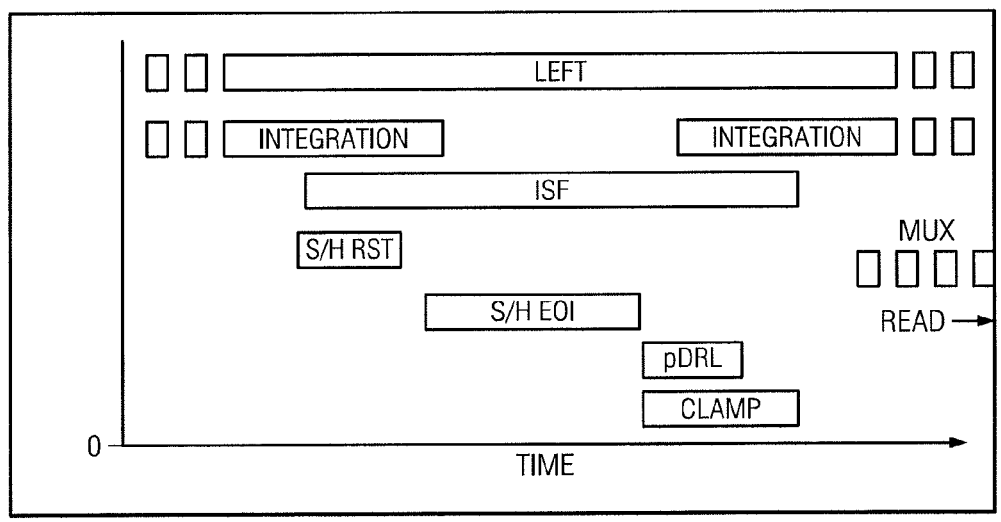

FIGS. 4A-4B illustrate an example configuration 400 of components of CMOS circuitry 206 of integrated circuit 202 coupled to image sensor 100, according to certain embodiments of the present invention. CMOS circuitry 206 may receive image signals 124 (e.g., a time delayed and integrated charge corresponding to a scan of a particular portion of a scanned object) from each detector sub-array 106 of a detector array 102 of image sensor 100, as described above. The image signals 124 first pass through a ping-pong column buffer 402. For example, ping-pong column buffer 402 may be a 320 K Ips ping-pong column buffer.

Image data corresponding to the received image signals 124 (i.e., an analog representation of the received image signals 124) may then converted from an analog signal (e.g., a voltage) to a digital signal by analog-to-digital (A/D) converter 404. The digital image data may then be stored in storage and TDI adder 406. Storage and TDI adder 304 may store the digital image data corresponding to received image signals 124 until digital image data has been stored corresponding to an image signal 124 received from each detector sub-array 106 of a particular detector array 102 of image sensor 100. Storage and TDI adder 406 may then combine the stored digital image data corresponding the received image signals 124 from each of the detector sub-arrays of the particular detector array 102 to generate digital combined image data (i.e., a digital representation of the summation of each of the digital image signals 124 of the particular detector array).

The digital combined image data may then be passed to encoder 408, low-voltage differential signaling (LVDS) drivers 410, and output via LVDS outputs 412. The output digital combined image data may then be used to generate an image of the particular portion of the scanned object.

FIGS. 5A-5B and FIGS. 6A-6B illustrate example notional configurations of CMOS circuitry and associated timing that may allow the direction in which image sensor 100 (described above with regard to FIGS. 1A-1C) generates an image signal corresponding to a scan of an object to be changed, according to certain embodiments of the present invention.

As discussed above with regard to FIGS. 1A-1C, TDI diffusions 116 may be located on either side of each detector sub-array 106 of a detector 102 of image sensor 100. As a result, each detector sub-array 106 may be operable to generate an image signal 124 corresponding to a scan of an object as the object moves in either direction relative to image sensor 100 (i.e., image sensor 100 may be operable to scan generally left or generally right). The example CMOS circuitry configurations and associated timing illustrated in FIGS. 5A-5B and FIGS. 6A-6B may facilitate a change from a first configuration (in which each detector sub-array 106 is configured to generate an image signal 124 corresponding to a scan of an object as the object moves in a first direction relative to image sensor 100) to a second configuration (in which each detector sub-array 106 is configured to generate an image signal 124 corresponding to a scan of an object as the object moves in a second, opposite, direction relative to image sensor 100). In other words, the example CMOS circuitry configurations and associated timing illustrated in FIGS. 5A-5B and FIGS. 6A-6B may allow the image sensor 100 to alternate between opposing scan directions.

Figure 7:
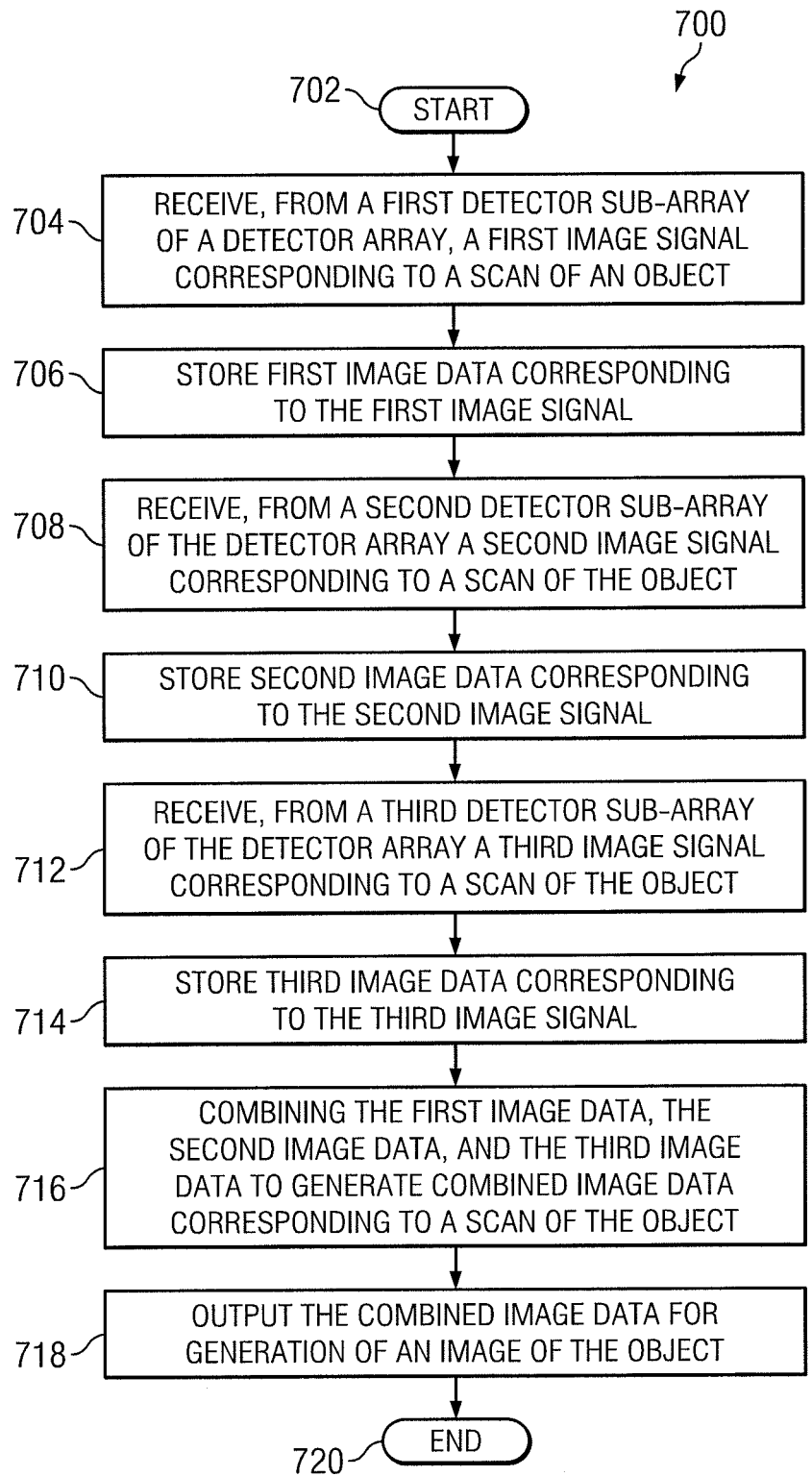
FIG. 7 illustrates an example method for generating an image of an object, according to certain embodiments of the present invention.

FIG. 7 illustrates an example method 700 for generating an image of an object, according to certain embodiments of the present invention. The method begins at step 702.

At step 704, CMOS circuitry 206 of integrated circuit 202 receives, from a first detector sub-array 106 of image sensor 100, a first image signal 124 corresponding to a scan of an object. For example, CMOS circuitry 206 may receive image signal 124a from detector sub-array 106a of image sensor 100, image signal 124a being a time-delayed and integrated charge generated by detectors 104a-104h of detector sub-array 106a, as described above with regard to FIGS. 1A-1C. Image signal 124a, having been generated by detectors 104a-104h of detector sub-array 106a, may be passed to TDI diffusion 116b and on to interconnect 118b. Interconnect 118b may be in electrical contact with circuit interconnect 204b of integrated circuit 202 such that CMOS circuitry 206 may receive image signal 124a. At step 706, CMOS circuitry 206 stores first image data corresponding to the received first image signal (e.g., an analog or digital representation of image signal 124a).

At step 708, CMOS circuitry 206 receives, from a second detector sub-array 106 of image sensor 100, a second image signal 124 corresponding to a scan of an object. For example, CMOS circuitry 206 may receive image signal 124b from detector sub-array 106b of image sensor 100, image signal 124b being a time-delayed an integrate charge generated by detectors 104i-104p of detector sub-array 106b, as described above with regard to FIGS. 1A-1C. Image signal 124b, having been generated by detectors 104i-104p of detector sub-array 106b, may be passed to TDI diffusion 116d and on to interconnect 118d. Interconnect 118d may be in electrical contact with circuit interconnect 204d of integrated circuit 202 such that CMOS circuitry 206 may receive image signal 124b. At step 710, CMOS circuitry 206 stores second image data corresponding to the received second image signal (e.g., an analog or digital representation of image signal 124b).

At step 712, CMOS circuitry 206 receives, from a third detector sub-array 106 of image sensor 100, a third image signal 124 corresponding to a scan of an object. For example, CMOS circuitry 206 may receive image signal 124c from detector sub-array 106c of image sensor 100, image signal 124c being a time-delayed and integrated charge generated by detectors 104q-104x of detector sub-array 106b, as described above with regard to FIGS. 1A-1C. Image signal 124c, having been generated by detectors 104q-104x of detector sub-array 106c, may be passed to TDI diffusion 116f and on to interconnect 118f. Interconnect 118f may be in electrical contact with circuit interconnect 204f of integrated circuit 202 such that CMOS circuitry 206 may receive image signal 124c. At step 714, CMOS circuitry 206 stores third image data corresponding to the received third image signal (e.g., an analog or digital representation of image signal 124c).

At step 716, CMOS circuitry 206 combines the stored first image data, the second image data, and the third image data to generate combined image data corresponding to a scan of the object. At step 718, CMOS circuitry 206 outputs the combined image data for generation of an image of the object. The method ends at step 720.

Although the particular steps of the method 700 have been illustrated and primarily described as being performed in a particular order and in a particular manner, the present invention contemplates that the steps take place in any suitable order and be performed in any suitable manner, according to particular needs. Additionally, although CMOS circuitry 206 of integrated circuit 202 is primarily described as combining image data generated based on a particular number of received image signals 124 (e.g., image signals 124a-124c), the present invention contemplates CMOS circuitry 206 of integrated circuit 202 combining image data generated based on any suitable number of received image signals 124. In other words, CMOS circuitry 206 may be operable to store any suitable number of image signals 124 received from any suitable number of detector sub-arrays 106 prior to generated combined image data (by combining image data corresponding to each of the received image signals 124, as described above).

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. An imaging device, comprising:
   an image sensor comprising a detector array, the detector array comprising
   a plurality of detectors that receive charges generated by light; and
   a plurality of detector sub-arrays, each detector sub-array comprising one or more of the plurality of detectors, the one or more detectors of each detector sub-array being in a time delay and integration (TDI) configuration, and each of the plurality of detector sub-arrays receiving charges generated by light having a same spectral range;
   wherein the image sensor, for each of the plurality of detector sub-arrays of the detector array, generates an image signal corresponding to a scan of an object, wherein the generated image signals each comprise time-delayed and integrated charges generated by the one or more detectors of a corresponding detector sub-array,
   wherein the image sensor further comprises a plurality of TDI diffusions, each TDI diffusion associated with a particular detector sub-array and receiving the image signal generated by the particular detector sub-array.

2. The imaging device of claim 1, wherein the time-delayed and integrated charge generated by the one or more detectors of a corresponding detector sub-array comprises an accumulation of charges generated by each of the one or more detectors of the corresponding detector sub-array, the charges being accumulated by passing the charges in either a first direction or a second direction, the second direction being opposite the first direction.

3. The imaging device of claim 1, wherein the image sensor comprises a plurality of TDI diffusions, each TDI diffusion associated with a particular detector sub-array and receiving the image signal generated by the particular detector sub-array.

4. The imaging device of claim 3, wherein each TDI diffusion is associated with a sensor interconnect.

5. The imaging device of claim 1, wherein the detector array comprises:
   sixty-four detectors; and
   eight detector sub-arrays, each detector sub-array comprising eight of the plurality of detectors, each of the eight detectors of each detector sub-array being in time delay integration (TDI).

6. The imaging device of claim 1, comprising:
   an integrated circuit coupled to the image sensor, wherein the integrated circuit:
      receives the image signals generated by the detector sub-arrays of the detector array;
      stores image data corresponding to the received image signals;
      combines the stored image data for each of the plurality of detector sub-arrays; and
      outputs the combined image data for generation of an image of the object.

7. The imaging device of claim 6, wherein the integrated circuit comprises complementary metal-oxide-semiconductor (CMOS) circuitry.

8. The imaging device of claim 6, wherein the stored image data comprises analog data corresponding to the received image signals.

9. The imaging device of claim 6, wherein the image data comprises digital data corresponding to the received image signals.

10. A method of generating an image of an object, comprising:
   receiving, from a first detector sub-array of a detector array, by a first TDI diffusion associated with the first detector sub-array, a first image signal corresponding to a first scan of an object, the first scan based on charges generated by light having a spectral range;
   storing first image data corresponding to the first image signal;
   receiving, from a second detector sub-array of the detector array, by a second TDI diffusion associated with the second detector sub-array, a second image signal corresponding to a second scan of the object, the second scan based on charges generated by light having the same spectral range as the first scan;
   storing second image data corresponding to the second image signal;
   combining the first image data and the second image data to generated combined image data corresponding to a scan of the object; and
   outputting the combined image data for generation of an image of the object.

11. The method of claim 10, wherein:

the detector array comprises a plurality of detectors;

the first detector sub-array of the detector array comprises a first subset of the plurality of detectors, the first subset of detectors of the first detector sub-array being in a time delay and integration (TDI) configuration; and the second detector sub-array of the detector array comprises a second subset of the plurality of detectors, the second subset of detectors of the second detector sub-array being in a TDI configuration.

12. The method of claim 11, wherein:

the first image signal comprises a first time-delayed and integrated charge generated by the first subset of detectors of the first detector sub-array; and the second image signal comprises a second time-delayed and integrated charge generated by the second subset of detectors of the second detector sub-array.

13. The method of claim 12, wherein:

the first time-delayed and integrated charge comprises a first accumulation of charges generated by each of the detectors of the first subset of detectors of the first detector sub-array, the first accumulation of charges being accumulated by passing the charges in either a first direction or a second direction, the second direction being opposite the first direction; and the second time-delayed and integrated charge comprises a second accumulation of charges generated by each of the detectors of the second subset of detectors of the second detector sub-array, the second accumulation of charges being accumulated by passing the charged in the same direction as the charged of the first accumulation of charges.

14. The method of claim 10, wherein:

the first image data comprises analog data corresponding to the first image signal; and the second image data comprises analog data corresponding to the second image signal.

15. The method of claim 10, wherein:

the first image data comprises digital data corresponding to the first image signal; and the second image data comprises digital data corresponding to the second image signal.

16. An imaging device, comprising:

an image sensor comprising a detector array, the detector array comprising a plurality of detectors that receive charges generated by light; and a plurality of detector sub-arrays, each detector sub-array comprising one or more of the plurality of detectors, the one or more detectors of each detector sub-array being in a time delay and integration (TDI) configuration;

wherein the image sensor, for each of the plurality of detector sub-arrays of the detector array, generates an image signal corresponding to a scan of an object, the generated image signals each comprising a time-delayed and integrated charge generated by the one or more detectors of a corresponding detector sub-array and generated by light having a same spectral range; and an integrated circuit comprising complementary metal-oxide-semiconductor (CMOS) circuitry coupled to the image sensor, wherein the integrated circuit:
  receives the image signals generated by each detector sub-array of the detector array;
  stores image data corresponding to the received image signals;
  combines the stored image data for each of the plurality of detector sub-arrays;
  and outputs the combined image data for generation of an image of the object;

wherein the image sensor further comprises a plurality of TDI diffusions, each TDI diffusion associated with a particular detector sub-array and receiving the image signal generated by the particular detector sub-array.

17. The imaging device of claim 16, wherein the time-delayed and integrated charge generated by the one or more detectors of a corresponding detector sub-array comprises an accumulation of charges generated by each of the one or more detectors of the corresponding detector sub-array, the charges being accumulated by passing the charges in either a first direction or a second direction, the second direction being opposite the first direction.

18. The imaging device of claim 16, wherein the stored image data comprises analog data corresponding to the received image signals.

19. The imaging device of claim 16, wherein the image data comprises digital data corresponding to the received image signals.

* * * * *